(12) United States Patent
Belcher et al.

(10) Patent No.: US 6,270,688 B1
(45) Date of Patent: Aug. 7, 2001

(54) CHEMICAL POLISHING OF BARIUM STRONTIUM TITANATE

(75) Inventors: James F. Belcher, Plano; Howard R. Beratan, Richardson, both of TX (US); Paul O. Johnson, Shreveport, LA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/224,211

(22) Filed: Apr. 7, 1994

(51) Int. Cl.$^7$ ....................................................... B44C 1/22
(52) U.S. Cl. .............................. 216/88; 216/89; 216/100; 216/101; 216/108; 252/79.2; 505/410; 505/728
(58) Field of Search .............................. 216/88, 89, 100, 216/101, 108; 252/79.2; 505/410, 728

(56) References Cited

U.S. PATENT DOCUMENTS

| | | | |
|---|---|---|---|
| Re. 29,336 | * 8/1977 | Lim | 156/626 |
| 4,080,246 | * 3/1978 | Battisti et al. | 156/656 |
| 4,412,886 | * 11/1983 | Sakaguchi et al. | 156/645 |
| 4,759,823 | * 7/1988 | Asselanis et al. | 156/659.1 |
| 5,205,901 | 4/1993 | Douglas et al. | 156/635 |
| 5,225,034 | * 7/1993 | Yu et al. | 156/636 |
| 5,258,093 | 11/1993 | Maniar | 156/626 |
| 5,318,927 | * 6/1994 | Sandhu et al. | 437/225 |
| 5,356,516 | 10/1994 | Ashby et al. | 156/667 |
| 5,516,346 | * 5/1996 | Cadien et al. | 216/89 |

FOREIGN PATENT DOCUMENTS

| | | |
|---|---|---|
| 664 978 A5 | 4/1988 | (CH) . |
| 58-64385 | * 7/1983 | (JP) . |

* cited by examiner

Primary Examiner—Randy Gulakowski
Assistant Examiner—Anita Alanko
(74) Attorney, Agent, or Firm—Baker Botts L.L.P.

(57) ABSTRACT

A method of polishing ferroelectric materials and specifically perovskite materials and still more specifically barium strontium titanate (1) wherein the surface (5) to be polished is initially partially smoothened or planarized by mechanical abrading with final smoothening or planarization provided by a chemical polishing with a polishing wheel using an acidic solution containing essentially the acid, hydrogen peroxide and water. Preferred acids are perchloric acid, acetic acid, nitric acid and combinations thereof.

10 Claims, 2 Drawing Sheets

CHEMICAL POLISHING OF BARIUM STRONTIUM TITANATE

CROSS REFERENCE TO PENDING APPLICATIONS

This application is related to an application entitled Method of Minimizing Surface Effects in Thin Ferroelectrics (TI-16728) U.S. Ser. No. 08/225,601, now U.S. Pat. No. 5,705,041 filed concurrently herewith, the contents of which are incorporated herein by reference.

BACKGROUND OF THE INVENTION

1. Field of the Invention

This invention relates generally to polishing of ferroelectric materials and, more specifically to polishing of perovskite materials and still more specifically to polishing of barium strontium titanate.

2. Brief Description of the Prior Art

The surfaces of ferroelectric materials and specifically barium strontium titanate have been smoothed or planarized in the prior art by a fully mechanical process wherein the surface of the material was abraded using progessively less course polishing materials or grits to abrade the surface being polished. Such polishing continued until the desired smoothness or planarity was achieved.

A problem with the above described polishing method is demonstrated in FIG. 1 wherein there is shown a volume of barium strontium titanate 1 with a metal layer 3 thereon and an interface 5 between the metal and the BST. It can be seen that the surface of the BST 1 at and immediately below the interface 5 has numerous dislocations therein. Ferroelectric materials and specifically barium strontium titanate material with these dislocations, when used in uncooled focal plane arrays and the like, prevent the barium strontium titanate from obtaining optimal performance by causing depression of the dielectric properties and the responsivity of the material. This problem is enhanced as the thickness of the ferroelectric material decreases because the dislocation region becomes a greater percentage of the total volume.

It has been determined that these dislocations are caused by the mechanical abrading of the ferroelectric material surface. It is therefore apparent that the performance of optical arrays using ferroelectric materials will be improved if the surface of the material can be polished with a minimum of or no abrading at all. It has also been determined that polishing using typical polishing materials in a slurry or colloidal suspension, such as aluminum oxide ($Al_2O_3$) or silicon dioxide, also produces dislocations on the ferroelectric material surface and can also modify the surface chemistry of the ferroelectric material.

SUMMARY OF THE INVENTION

In accordance with the present invention, the region of dislocation is minimized at the surface of the ferroelectric material and the resulting ferroelectric material is provided with a surface region having materially fewer dislocations than were encountered by use of prior art procedures as described above.

Briefly, the ferroelectric material is initially polished by an abrading technique as in the prior art. However, the mechanical polishing terminates at a point prior to obtaining the desired smoothness, planarity and thickness with the final portion of the ferroelectric material surface being removed by a chemical polishing procedure.

The chemical polishing portion of the polishing procedure commences with a chemical polishing using an acidic solution. The acid used can be an organic acid, a mineral acid, a reducing acid, an oxidizing acid and combinations thereof. Appropriate acids which can be used in the acidic solution are perchloric acid, acetic acid (preferably glacial), nitric acid. The acid or combination of acids is combined with an oxidizing agent, preferably hydrogen peroxide and water, preferably deionized.

The polish in the form of an acidic solution is applied to the ferroelectric material surface in conjunction with a polishing wheel or the like in standard manner. The polishing surface on the polishing wheel can be absorbent and absorb polish to be deposited on the ferroelectric material surface or porous with the polish travelling therethrough to the ferroelectric material surface or in other known ways. The polishing surface can also be rigid for use with a hydroplaning polish.

The ferroelectric material is preferably but not necessarily doped in standard manner.

DESCRIPTION OF THE PREFERRED EMBODIMENTS

In accordance with the invention, a surface of a volume of barium strontium titanate, preferably but not necessarily doped in standard manner, is initially polished with a polishing wheel of standard type, for example of the type discussed in the above noted copending application with the chemical polishing agent being deposited on the barium strontium titantate either ahead of the polishing wheel or within the polishing wheel until the desired degree of smoothness, planarity and thickness of the surface was achieved. For example, a polishing agent with progressively smaller particle sizes can be used, commencing, for example, with a Blanchard grind as the polishing agent to polish the substrate to about 0.012 inch. Then a 9 micron grind is used until the substrate thickness is about 0.0013 to about 0.0014 inch. This is followed by a 1 micron grind until the substrate thickness is about 0.0008 inch and then a 0.3 micron grind until the substrate thickness is about 0.00035 inch and the followed by a 0.05 micron grind until the substrate thickness is about 0.00025 inch.

EXAMPLE 1

In accordance with a first example of the invention, the chemical polish consisted essentially of:

| | |
|---|---|
| Perchloric acid (49%) | 75 ml |
| Hydrogen peroxide (30%) | 75 ml |
| Water | 300 ml |

In this example, the perchloric acid and the hydrogen peroxide can each be varied ±80% with water making up the remainder of the volume.

EXAMPLE 2

In accordance with a second example of the invention, the chemical polish consisted essentially of:

| | |
|---|---|
| Glacial acetic acid | 100 ml |
| Nitric acid (70%) | 10 ml |
| Hydrogen peroxide (30%) | 20 ml |
| Water | 300 ml |

In this example, the acetic acid and nitric acid can be varied ±80% with water and hydrogen peroxide making up the remainder of the volume. When nitric acid is used, the hydrogen peroxide can be omitted.

Figure 1:
FIG. 1 is a diagram of a volume of barium strontium titanate which has been polished in accordance with prior art techniques with a metal layer disposed over the polished surface and showing the dislocations in the barium strontium titanate.
Figure 2:
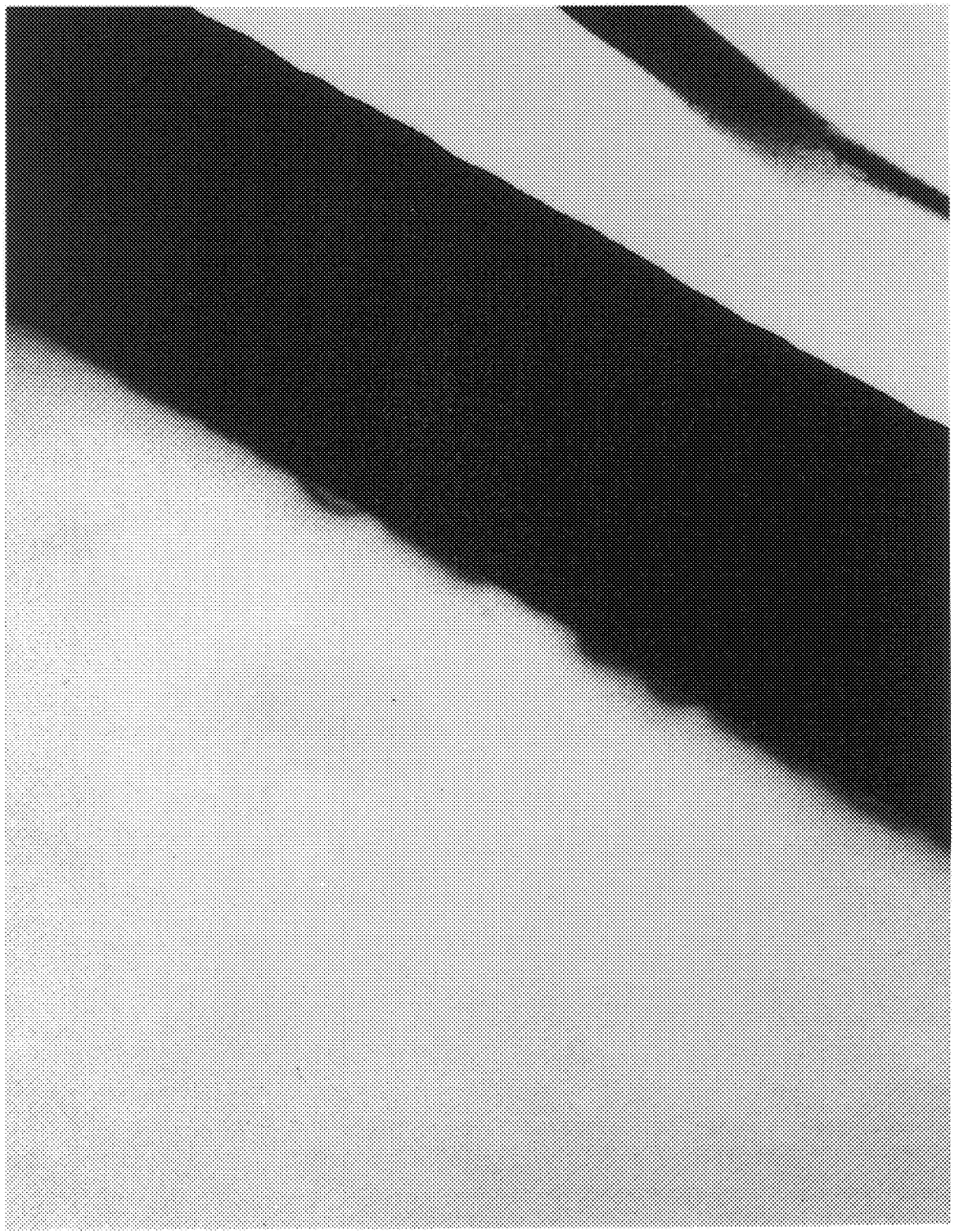
FIG. 2 is a diagram as in FIG. 1 using the polishing techniques in accordance with the present invention and showing essentially no dislocations.

As can be seen with reference to FIG. 2, the surface of the barium strontium titanate 1 at the interface 5 with the metal 3 has essentially no dislocations. It is therefore apparent that the polishing method in accordance with the present invention provides dislocation removal and performance enhancement relative to prior art techniques. In addition, the above described polishing method provides faster material removal than in the prior art and provides very flat smooth surfaces chemically prepared in single or polycrystalline materials.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

What is claimed is:

1. A method of polishing a ferroelectric material comprising the steps of:
   (a) providing a ferroelectric surface to be polished;
   (b) applying an acidic polish solution to said surface containing from a finite amount greater than zero to about 80% by volume of an acid taken from the class consisting of organic acids, mineral acids, reducing acids and oxidizing acids and combinations thereof, from a finite amount greater than zero to about 80% by volume of a strong oxidizing agent and the remainder water; and
   (c) polishing said surface with a polishing member disposed external to and not a part of said polish solution while said polish solution is on said surface.

2. The method of claim 1 wherein said ferroelectric material is a perovskite material.

3. The method of claim 2 wherein said perovskite material is barium strontium titanate.

4. The method of claim 1 wherein said polish consists essentially of 75 parts by weight perchloric acid, 75 parts by weight 30% hydrogen peroxide and the remainder to provide 450 parts by weight of water.

5. The method of claim 2 wherein said polish consists essentially of 75 parts by weight perchloric acid, 75 parts by weight 30% hydrogen peroxide and the remainder to provide 450 parts by weight of water.

6. The method of claim 3 wherein said polish consists essentially of 75 parts by weight perchloric acid, 75 parts by weight 30% hydrogen peroxide and the remainder to provide 450 parts by weight of water.

7. The method of claim 1 wherein said polish consists essentially of 100 parts by weight glacial acetic acid, 10 parts by weight 70% nitric acid, 20 parts by weight 30% hydrogen peroxide and the remainder to provide 450 parts by weight of water.

8. The method of claim 2 wherein said polish consists essentially of 100 parts by weight glacial acetic acid, 10 parts by weight 70% nitric acid, 20 parts by weight 30% hydrogen peroxide and the remainder to provide 450 parts by weight of water.

9. The method of claim 3 wherein said polish consists essentially of 100 parts by weight glacial acetic acid, 10 parts by weight 70% nitric acid, 20 parts by weight 30% hydrogen peroxide and the remainder to provide 450 parts by weight of water.

10. An acidic solution polish for a ferroelectric material surface consisting essentially of 75 parts by weight perchloric acid, 75 parts by weight 30% hydrogen peroxide and the remainder to provide 450 parts by weight of water.

* * * * *

UNITED STATES PATENT AND TRADEMARK OFFICE
CERTIFICATE OF CORRECTION

PATENT NO.    : 6,270,688 B1
DATED         : August 7, 2001
INVENTOR(S)   : James F. Belcher et al.

It is certified that error appears in the above-identified patent and that said Letters Patent is hereby corrected as shown below:

<u>Title page,</u>
Item [56], References Cited,
Insert -- 5,289,057    2/1994    Kinugasa --.
Insert -- 5,439,840    8/1995    Jones, Jr. et al. --.

Signed and Sealed this

Sixteenth Day of July, 2002

Attest:

JAMES E. ROGAN
Attesting Officer     Director of the United States Patent and Trademark Office